United States Patent [19]

Daman et al.

[11] 4,057,410
[45] Nov. 8, 1977

[54] HEAT SHIELD FOR FLOAT GLASS FORMING APPARATUS AND METHOD OF USING

[75] Inventors: Lloyd W. Daman, Pemberville; Don V. Marti, II, Toledo; Freddie Mason, Oregon; Donald E. Shamp, Millbury, all of Ohio

[73] Assignee: Libbey-Owens-Ford Company, Toledo, Ohio

[21] Appl. No.: 715,549

[22] Filed: Aug. 18, 1976

[51] Int. Cl.² ............................................ C03B 18/02
[52] U.S. Cl. ................................. 65/65 A; 65/99 A; 65/182 R
[58] Field of Search ................. 65/65 A, 99 A, 182 R

[56] References Cited

U.S. PATENT DOCUMENTS

| | | | |
|---|---|---|---|
| 710,357 | 9/1902 | Heal | 65/65 A |
| 3,218,143 | 11/1965 | Delajarte | 65/65 A |
| 3,433,614 | 3/1969 | Dickinson et al. | 65/65 A |
| 3,583,863 | 6/1971 | Miwa et al. | 65/182 R |

*Primary Examiner*—Arthur D. Kellogg
*Attorney, Agent, or Firm*—Collins, Oberlin & Darr

[57] ABSTRACT

A float glass forming apparatus including a tank having an exit end over which a glass ribbon carried on a bath of molten metal contained in the tank is discharged. The exit end wall of the tank is provided with a cooler covered by a heat shield that maintains the external surfaces of the cooler at a temperature below the melting point of the molten metal bath so that molten metal coming into contact therewith is solidified.

7 Claims, 1 Drawing Figure

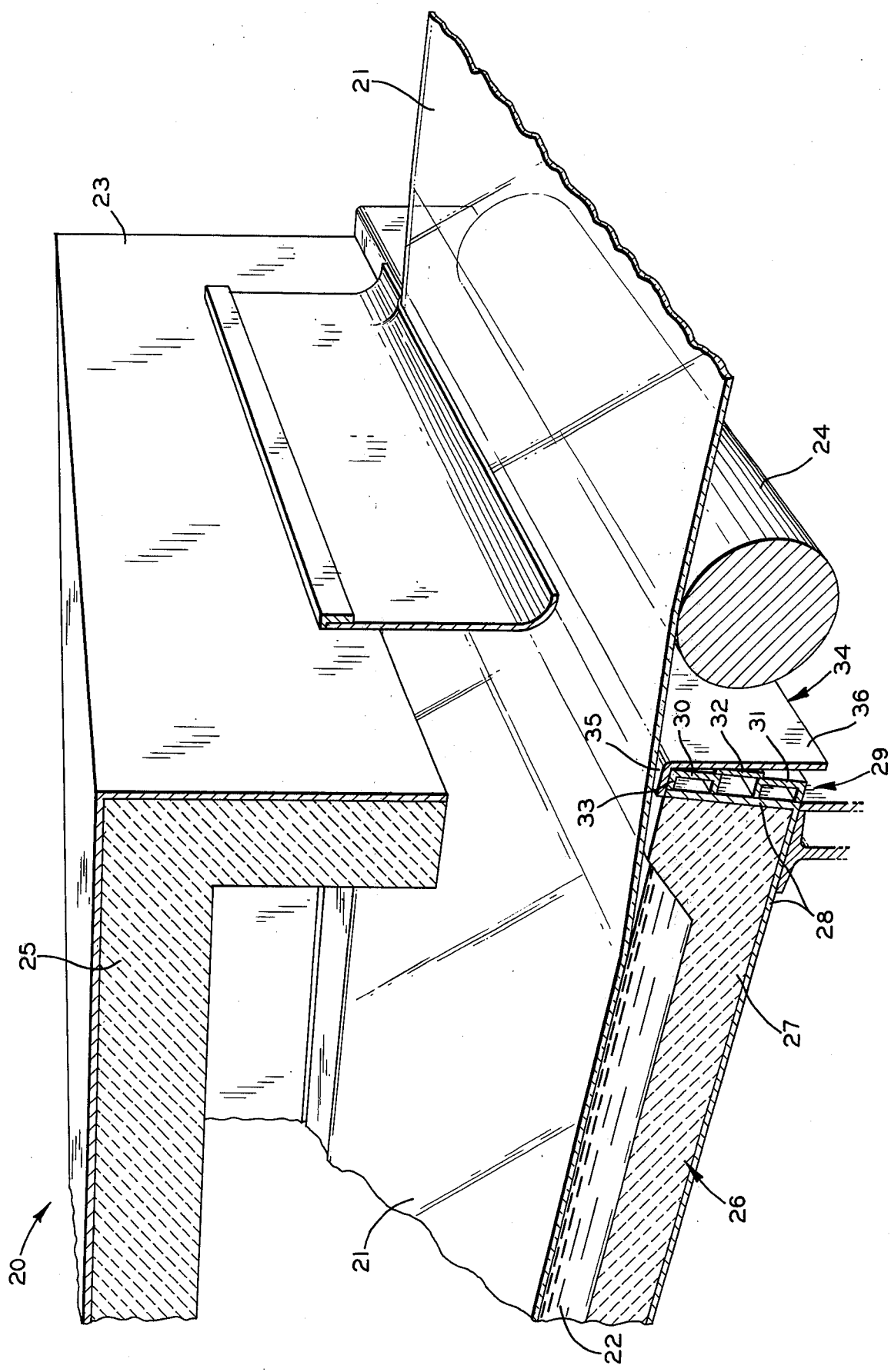

HEAT SHIELD FOR FLOAT GLASS FORMING APPARATUS AND METHOD OF USING

BACKGROUND OF THE INVENTION

1. Field of the Invention

The present invention relates generally to the continuous manufacture of flat glass in ribbon form by the float process, and more particularly to devices for cooling and shielding the exit end of a float tank from heat radiating from surrounding bodies at higher temperatures.

2. Description of the Prior Art

A conventional form of a float glass forming apparatus is illustrated and described in U.S. Pat. No. 3,607,202 issued on Sept. 9, 1971. As therein explained, the manufacture of flat glass by the float process involves delivering molten glass at a controlled rate onto a relatively wide bath of molten metal such as tin or an alloy of tin, and advancing it along the surface of the bath under physical and thermal conditions which assure that (1) a layer of molten glass will be established on the metal bath, (2) the glass in the layer can flow laterally to develop on the surface of the bath a buoyant body of molten glass of stable thickness, and (3) that the buoyant body in ribbon form will be continuously advanced along the bath and sufficiently cooled as it advances to permit it to be taken from the bath by lift-out conveying rolls. Above the float bath of molten metal a superstructure forming a tightly enclosed head-space or plenum chamber is provided to contain a so-called float atmosphere.

Such a float glass forming apparatus generally includes an enclosed, roofed refractory structure surrounded by a metallic casing, with the molten metal being contained within the lower section of the refractory structure. Radiant heaters and coolers conventionally provided within the headspace maintain the ribbon at various elevated temperatures along its length according to a prescribed pattern as required to practice the above-described process. The temperature of the glass in the buoyant layer or ribbon must be carefully controlled so as to progressively cool it from the entrance end to the discharge end of the chamber, by which time the ribbon surfaces reach a temperature of about 1200° F. (643° C.) at which the ribbon is sufficiently stiffened to allow its transfer to a lehr on mechanical conveying means.

A cooler such as disclosed in U.S. Pat. No. 3,433,614, issued on Mar. 19, 1969, is attached to the metallic casing enclosing the refractory structure of the lower section at its exit end for preventing warping of the casing and consequent separation from the refractory structure due to the differential expansion of the different materials under the severe temperature encountered in this area. In order to permit the glass ribbon to be removed from the surface of the molten metal along a path which is as nearly horizontal as possible, that is, without being subjected to a substantial change in direction at this critical stage, it is desirable to maintain the level of the molten metal very near the top of the end wall of the refractory structure. The molten metal flows over, or through the joints in, the refractory blocks to contact in its molten state the metallic cooler. When the molten metal contacts the exposed surfaces of the cooler, it corrosively attacks and subsequently eats through the cooler, thus allowing the molten metal to escape. The cooler itself is unable to solidify the molten metal coming into contact therewith because of the aforementioned severe temperature conditions due to heat radiating from the hot glass ribbon and other surrounding bodies such as the glass lift-out conveying rolls.

It has been proposed in the past to shield the exposed surfaces of the atmosphere cooler from its surrounding hotter environment. However, because of the small clearance between the bottom surface of the glass ribbon and the top surface of the cooler, it is not practical to place conventional heat insulating material such as millboard or hotboard insulation therebetween since the glass ribbon in its plastic form may sag and contact the insulation material. Such contact marks and renders the glass unfit for commercial use. Another disadvantage of conventional insulating materials is that they are not sufficiently rigid to take a permanent set when they are formed into a desired shape so as to remain in place over the cooler.

SUMMARY OF THE INVENTION

It has been discovered that when conventional millboard or hotboard insulating materials have been soaked in a solution of potassium sulfate, the insulating material will not mark a newly formed glass ribbon which happens to come into contact with it. Also, it has been found that the insulation material, which is normally resilient, will take a permanent set when it has been so treated whereby it can be formed into a desired shape. In accordance with the present invention, a radiant heat shield constructed of a potassium sulfate treated millboard insulation material is suspended over the atmosphere cooler to shield it from heat radiating the surrounding hot bodies, particularly the heat radiating from the newly formed ribbon of glass. The heat shield is provided with a first portion which is placed between the top of the cooler and the undersurface of the glass ribbon, and a second portion which covers the exposed vertical face of the cooler. The surface temperature of the cooler can thus be maintained at approximately 100° F. below the melting point of the molten metal so that any molten metal coming in contact with the cooler is solidified.

OBJECTS AND ADVANTAGES

An object of the invention is to shield the exit end of a float glass forming apparatus from heat radiating thereto from surrounding hotter bodies.

Another object of the invention is to cool the exit end of a float glass forming apparatus to a temperature lower than the melting temperature of the molten metal therein, and to shield the exit end from heat radiating thereto from surrounding bodies having temperatures greater than the cooled exit end.

Yet another object of the invention is to provide a float glass forming apparatus with a radiation shield which is so treated that it will not mark a newly formed ribbon of glass coming in contact therewith.

Other objects and advantages of the invention will become more apparent during the course of the following description when taken in connection with the accompanying drawing.

BRIEF DESCRIPTION OF THE DRAWING

The accompanying drawing is a perspective view, partly in section, of the exit end of a float glass forming apparatus embodying the invention.

DESCRIPTION OF THE PREFERRED EMBODIMENTS

Referring now to the drawing, there is illustrated the exit end of a typical float glass apparatus 20, wherein a ribbon of glass 21 has been developed by advancing the glass across a bath of molten metal 22, such as tin, under proper drawing and temperature conditions, the details of which are well known to those skilled in the art and are not pertinent to the present invention.

Also, as is well known, the temperature within the apparatus 20 is regulated so that it descends according to a predetermined pattern to a level at its exit end 23 whereat the ribbon of glass 21 has sufficiently stiffened to allow its transfer to a lehr (not shown) on mechanical conveying means without detriment to its surface, e.g. at a temperature of about 1200° F. (643° C.).

The glass ribbon 21 is removed from the molten metal bath 22 by mechanical supporting and conveying means exemplified by a lift-out roll 24 which is mounted outside the exit end 23 of the apparatus 20.

The apparatus 20 generally includes an upper closed structure 25 which defines an enclosed headspace over a lower tank structure 26 which contains the molten metal bath 22. It is conventional within the tank structure 26 to employ refractory walls 27 for containing the molten metal and to enclose these walls 27 in a metal casing 28. The casing 28 is provided to prevent loss of the molten metal bath 22 through joints (not shown) between, or through cracks or fissures within, the refractory blocks from which the walls 27 are fabricated. As previously indicated, it is preferable to form the ribbon of glass 21 on a bath of molten tin. Tin has a melting point of about 400° F. (204° C.), and in its molten state is highly fluid and very corrosive to conventional metals such as the steel from which the casing is fabricated. To this end, the casing is conventionally cooled to a temperature below the melting point of the tin as by blowing ambient atmosphere thereagainst so that tin coming in contact with the casing will solidify.

An atmosphere cooler 29 similar to the one disclosed in the aforementioned U.S. Pat. No. 3,433,614 is conventionally disposed on that portion of the casing 28 surrounding the exit end wall over which the glass ribbon 21 is discharged in an effort to maintain the temperature of the exit end of the tank at a level below the melting point of the molten tin bath. The cooler 29 is a three-pass device fabricated by attaching rectangular U-shaped sections 30 and 31 along the top and bottom of the end wall casing 28 and then welding a plate 32 over the space between the two rectangular sections 30 and 31 to form a third passageway. Further details and operation of the cooler are well known to those skilled in the art and need not further be discussed since they are not pertinent to the present invention.

The atmosphere cooler 29 is exposed to heat radiated from the glass sheet 21 just after it is lifted from the tin bath as well as heat from the first lift-out roll 23, so that it operates in a region of severe temperature conditions, i.e. about 1200° F. (643° C.). Since the surfaces of the cooler 29 are exposed to severe temperatures, molten tin coming into contact therewith will not solidify but instead remain in its fluid state and thus cause deterioration of the wall areas of the cooler, particularly the top wall of the rectangular tube 30. It has been found that when molten tin has come into contact with and eaten through the tube 30 it flows down into the area where the plate 32 is welded to the bottom tube 31 and eventually eats the weld area away, and allowing the molten tin to escape from the tank 26.

Accordingly, it is desirable to reduce the amount of radiant heat reaching the top edge 33 of the cooler 29 whereby its rate of heat removal will cause molten tin to be solidified or frozen at the point where it first eats its way into and flows through the cooler 29. Thus, according to the invention, a novel heat shield 34 is provided to insulate the top edge 33 of the cooler 29, as well as its exposed vertical face, from the glass ribbon 21 and the lift-out roll 23 to reduce the amount of radiant heat reaching the cooler 29. The novel heat shield 34 comprises a first portion 35 which is designed to lay over the top edge 33 beneath the bottom surface of the glass ribbon 21, and a second portion 36 which is designed to hang in front of the cooler 29, and between it and the lift-out roll 24. As shown in the accompanying drawing, the first portion 35 may lie directly on the top edge 33 of the cooler, with the second portion being suspended therefrom in front of the exposed face of the cooler 29. The novel heat shield 34 is formed from a sheet of conventional insulating millboard which is bent to a desired shape and soaked in a solution of potassium sulfate. For example, a heat shield formed from a one-fourth inch thick sheet of conventional millboard (composed primarily of asbestos fibers), which is soaked in a hot, saturated solution of potassium sulfate for a sufficient length of time to completely saturate the millboard which is then completely dried, has been found to perform extremely well in this environment.

It has been found that with the novel heat shield 34 suspended over the cooler 29, the cooler is so insulated from its surrounding environment that the external temperature in the shielded area is maintained at approximately 100° below the melting point of the molten tin. Consequently, molten tin coming into contact with the cooler 29 is solidified before it can escape from the tank 26.

The novel heat shield, made in accordance with the invention, may be used at the exit end of a new float glass forming apparatus to prevent deterioration of the cooler from attack by any molten tin which may escape from the bath over the lip tiles forming the exit end of the apparatus. Thus, the cooler can safely function to reduce the temperature of the bath casing below the melting temperature of the molten tin thereby preventing tin leaks from occurring at the lip tiles and the joints therebetween. However, the novel heat shield has particular utility in stopping tin leaks at the exit end of an existing float glass forming apparatus once they have occurred by reducing the temperature of the affected region below the melting point of the molten tin whereby the molten tin at the leak is solidified. This feature is particularly advantageous in that previously once a tin leak occurred the production of glass had to be interrupted to replace the lip tiles, which might cost as much as $100,000.00. In this case, the heat shield is formed as previously described and installed over the cooler while a ribbon of glass is being produced by float glass forming apparatus.

It is to be understood that the form of the invention herewith described is to be taken as an illustrative embodiment only of the same and that various changes in the size and shape of the apparatus may be resorted to without departing from the spirit of the invention.

We claim:
1. A float glass forming apparatus comprising:

a. a tank containing a bath of molten metal upon which a ribbon of glass is continuously formed;

b. an exit end on said tank defining a lip over which said ribbon is discharged;

c. means mounted on said exit end next to said lip for cooling said exit end of said tank; and d. means loosely mounted on said cooling means adjacent said lip for shielding said cooling means from heat radiating from said ribbon glass whereby the surface of said cooling means is maintained at a temperature such that molten metal escaping from said exit end lip of said tank and contacting said cooling means is solidified.

2. A float glass forming apparatus as claimed in claim 1, wherein said shielding means comprises a sheet of heat insulating board treated with potassium sulfate.

3. A float glass forming apparatus as claimed in claim 1, wherein said shielding means is suspended from said cooling means and covers the exposed faces of said cooling means.

4. A float glass forming apparatus as claimed in claim 3, wherein said cooling means includes a top wall and an outside face, and said shielding means has a first portion covering said top wall of said cooling means and a second portion covering said outside face of said cooling means.

5. A method of stopping a tin leak at the exit end of an operating float glass forming apparatus having a tank containing a bath of molten tin upon which a ribbon of glass is continuously formed and a cooler at the exit end of the tank wherein the exit end of the tank and cooler absorb heat radiated from the adjacent glass ribbon and lift-out and conveying rolls of higher temperature comprising the steps of:

a. forming a heat shield from a sheet of millboard insulating material;

b. treating the formed sheet of insulating material with a solution of potassium sulfate; and c. interposing said heat shield between said cooler and said glass ribbon and lift-out and conveying rolls so that said cooler can be operated at a rate to reduce its outside temperature below the melting temperature of the tin.

6. A method of stopping a tin leak in the exit end of an operating float glass forming apparatus as claimed in claim 5, wherein the treating of the formed sheet includes the steps of:

a. soaking said formed sheet of insulating material in a hot saturated solution of potassium sulfate for a sufficient length of time to completely saturate said sheet of insulating material; and b. drying said saturated sheet of insulating material, whereby the glass ribbon produced by said forming apparatus and coming into contact with said sheet of insulating material is not marred.

7. A float glass forming apparatus of the type including a tank containing a bath of molten metal upon which a ribbon of glass is continuously formed, and having an exit end wall defining an exit lip over which the ribbon of glass is discharged on supporting and conveying means located adjacent the exit end, the improvement comprising:

a. means mounted on said exit end wall next to said exit lip for cooling said exit end wall of said tank; and b. means suspended from said cooling means and interposed between said cooling means and said ribbon of glass and said supporting and conveying means for shielding said cooling means from heat radiating from said ribbon of glass and said supporting and conveying means so that any molten metal escaping from said tank over said exit lip and contacting said cooling means will be solidified.

* * * * *